United States Patent [19]

Togawa et al.

[11] Patent Number: 5,121,442
[45] Date of Patent: Jun. 9, 1992

[54] FIGURE INPUT SYSTEM

[75] Inventors: Fumio Togawa, Nara; Hitoshi Hirose, Osaka, both of Japan

[73] Assignee: Sharp Kabushiki Kaisha, Osaka, Japan

[21] Appl. No.: 769,582

[22] Filed: Oct. 2, 1991

Related U.S. Application Data

[63] Continuation of Ser. No. 565,175, Aug. 9, 1990, which is a continuation of Ser. No. 233,169, Aug. 17, 1988, abandoned.

[30] Foreign Application Priority Data

Sep. 3, 1987 [JP] Japan .................................. 62-220932

[51] Int. Cl.⁵ .............................................. G06K 9/00
[52] U.S. Cl. ..................................... 382/13; 382/23; 382/25; 340/709
[58] Field of Search ............... 382/13, 25, 26, 44, 382/23; 340/712, 709; 364/488, 491, 518; 178/18

[56] References Cited

U.S. PATENT DOCUMENTS

| | | | |
|---|---|---|---|
| 4,607,386 | 8/1986 | Morita et al. | 382/13 |
| 4,653,107 | 3/1987 | Suojima et al. | 382/13 |
| 4,672,677 | 6/1987 | Yamakawa | 382/13 |
| 4,698,625 | 10/1987 | McCaskill et al. | 340/709 |
| 4,718,103 | 1/1988 | Shojima et al. | 382/13 |

*Primary Examiner*—David K. Moore
*Assistant Examiner*—Yon Jung
*Attorney, Agent, or Firm*—Morrison & Foerster

[57] ABSTRACT

A figure input system includes an input device such as a digitizer through which coordinate data of points on a figure to be inputted are time-wise continuously received. These data are sampled sequentially at set time intervals and are analyzed in view of the kind of basic figure intended by the user such that geometrical characteristics and position data are extracted from the sampled data and a regular basic figure can be displayed on a display device.

5 Claims, 6 Drawing Sheets

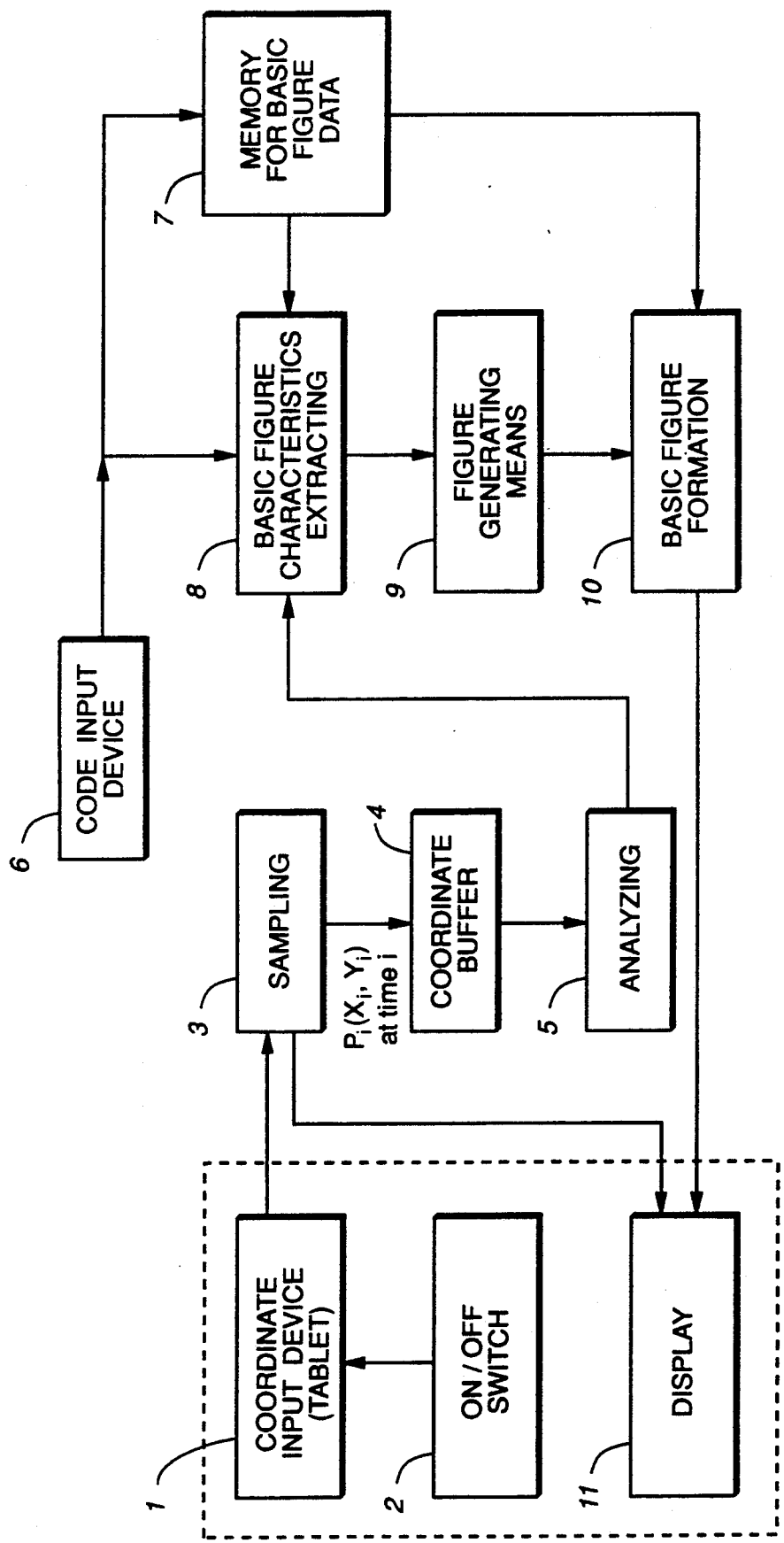
FIG._1

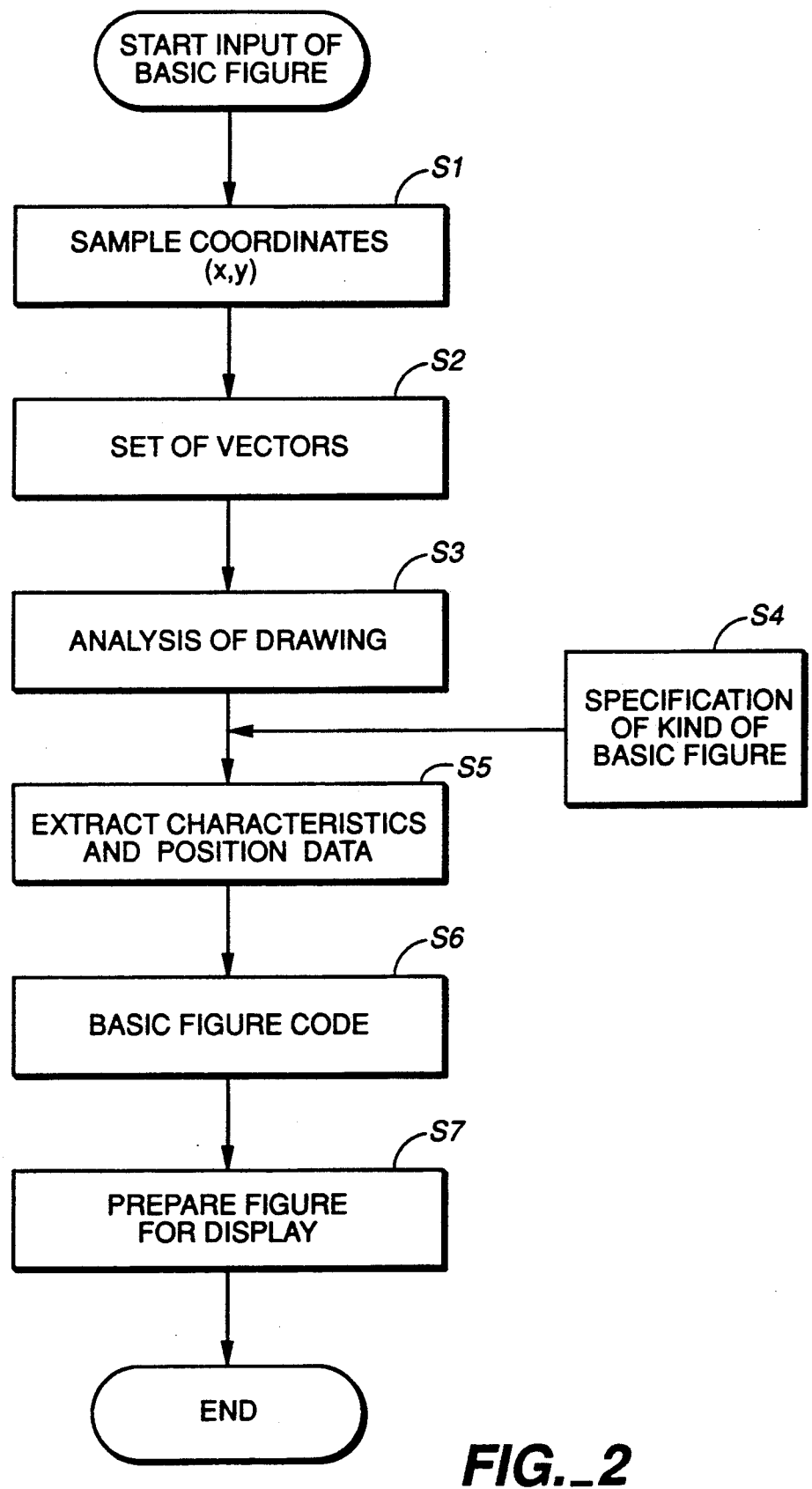
FIG._2

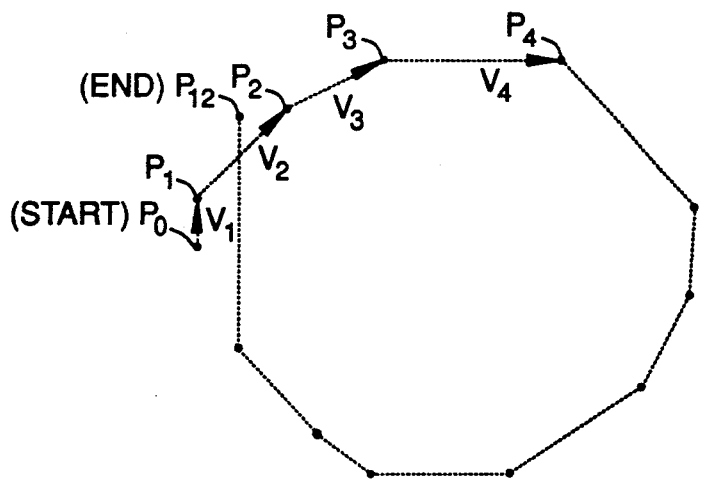
FIG._3A
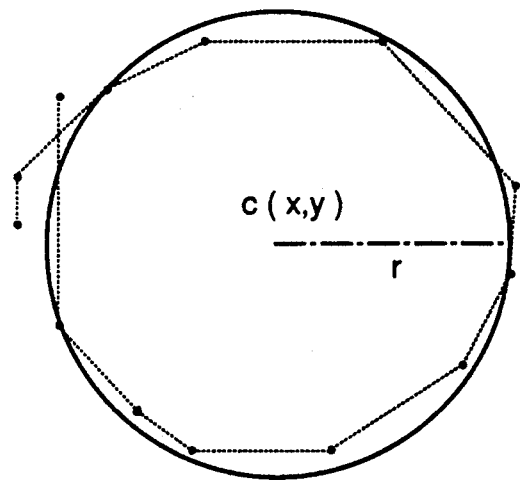
FIG._3B
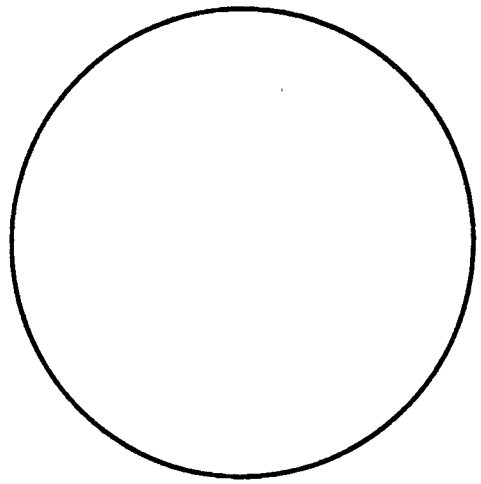
FIG._3C

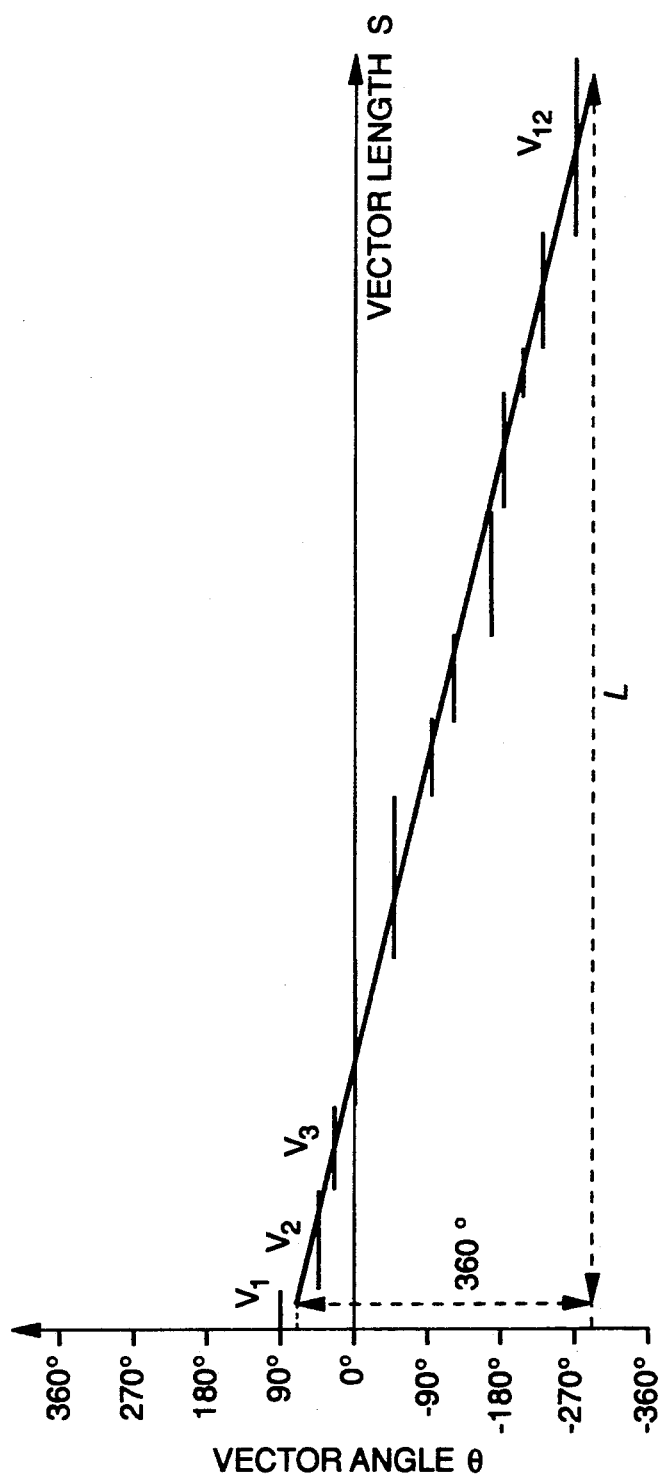
FIG._4

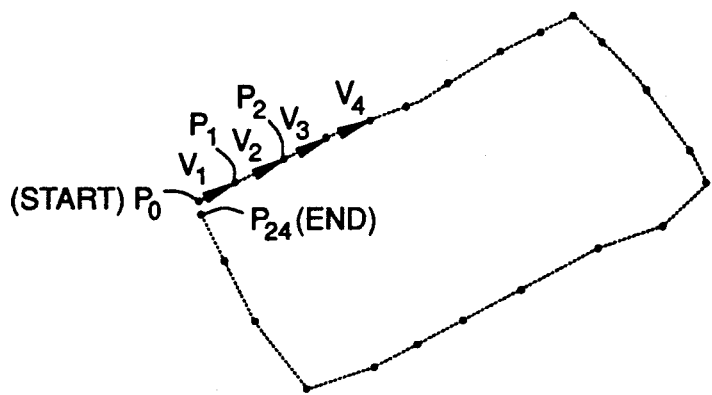
FIG._5A
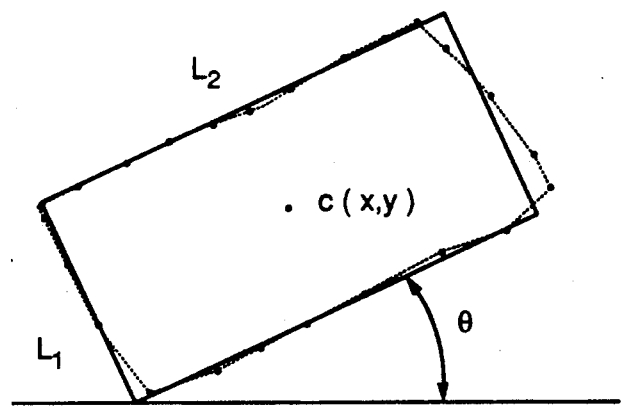
FIG._5B
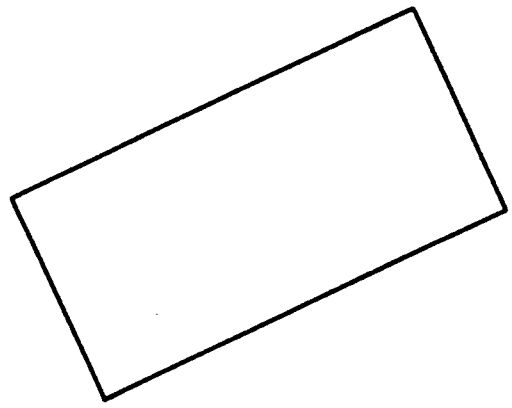
FIG._5C

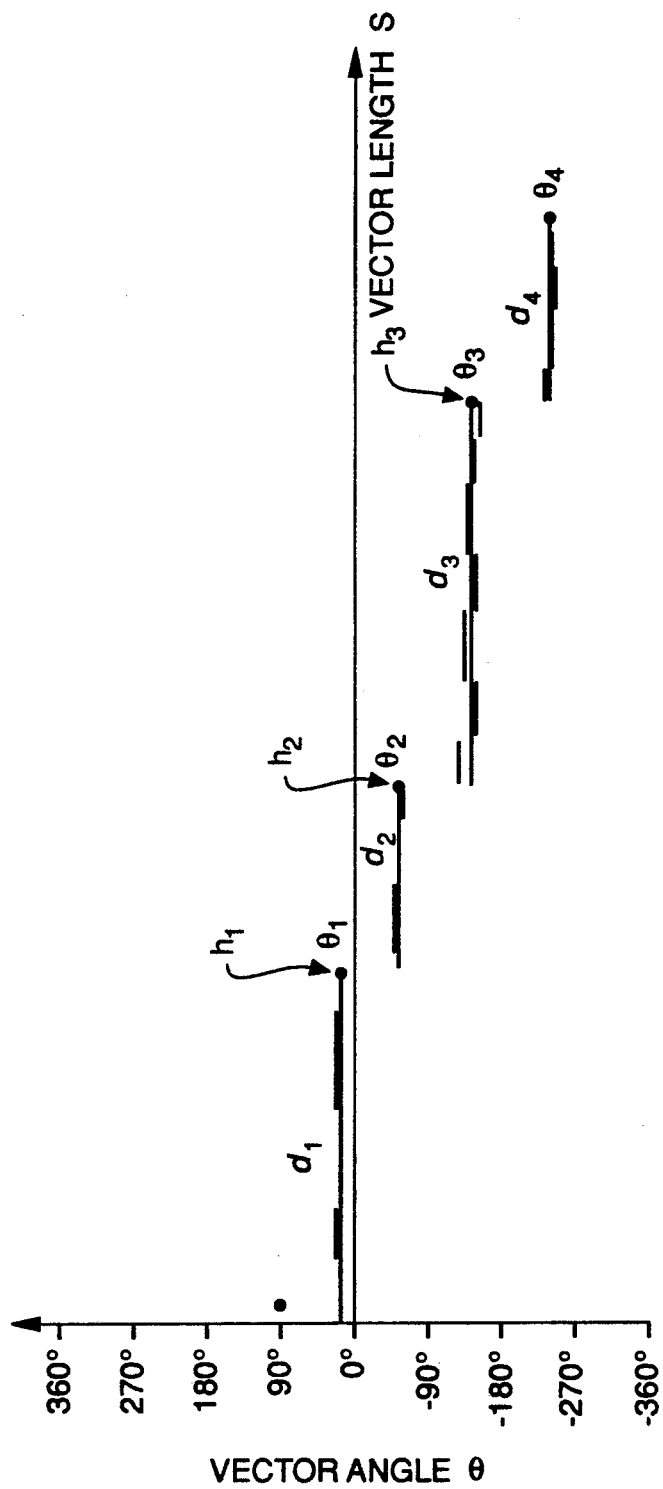
FIG._6

FIGURE INPUT SYSTEM

This application is a continuation, of U.S. application Ser. No. 07/565,175, filed Aug. 9, 1990, which is a continuation of U.S. application Ser. No. 233,169 filed Aug. 17, 1988, to be abandoned.

BACKGROUND OF THE INVENTION

This invention relates to a figure input system for time-wise continuously inputting coordinate data of basic figures such as line segments, triangles, rectangles, polygons, circles, ellipses and parabolas from a coordinate input device such as a digitizer or a tablet.

When it is desired to input an original figure into a computer, it has been customary to directly input coordinate data of figures by using a CAD (computer aided design) device such as a mouse, a digitizer or a tablet or, in the case of a word processor, keys, a mouse or a tablet with high pointing accuracy. On the other hand, the following two methods are known for inputting basic figures such as circles and rectangles into a computer. One is to use numeric keys or a light pen to input characteristic geometrical components of the basic figures such as the radius of a circle or the two sides of a rectangle and its position on the display screen such as the center of the circle or the center of gravity and the slope of the longer side of the rectangle. The other is to place a similar basic figure (having the same shape as the desired figure) at the desired position on the display screen by using numeric keys or a light pen and then to enlarge or reduce its size.

These prior art methods are designed to simplify the input by observing that basic figures are regularly shaped and hence can be uniquely determined if their characteristic geometrical data and positions are determined. Since basic figures are constituent elements of the final display, however, it is preferable that the user can directly draw a desired figure of a desired size at a desired position as by a conventional input method of original figures. From this point of view, the first of the two methods explained above is inconvenient because the positioning of the figure is effected indirectly and the second of them is inconvenient because the size of the desired figure is specified indirectly. By either method, the user's image cannot be fully reflected. These methods are therefore not easy to use. On the other hand, if basic figures are inputted in the same way as an original figure, it must be ascertained what kinds of basic figure are inputted by a digitizer or the like. In other words, sizes, orientations and so forth of many basic figures must be taken into consideration in comparing with an input figure and this becomes an enormous job. In addition, similarly shaped figures cannot be distinguished easily by such a method, for example, between a fan shape and an equilateral triangle having the same top angle.

SUMMARY OF THE INVENTION

It is therefore an object of the present invention to provide a figure input system with which it is possible not only to fully reflect the user's image by using a conventional input method of original figures but also to reduce the work of identifying inputted figures and to quickly input coordinate data of regular basic figures corresponding to the inputted figures.

The above and other objects of the present invention are achieved by providing a figure input system comprising a coordinate input device such as a digitizer or a tablet, a sampling device for sampling at specified time intervals the coordinate data of basic figures inputted from this coordinate input device in a time-wise continuous manner, a memory device for storing the coordinate data sequentially sampled by the sampling device, a figure specifying means for specifying kinds of basic figures, an extracting means for analyzing and extracting geometrical characteristics and position data of basic figures from the aforementioned coordinate data on the basis of the kind of basic figure specified by the user through the figure specifying means and a figure generating means for codifying a hand-drawn figure as a regular basic figure on the basis of geometric characteristics and position data extracted by the extracting means such that the codified basic figure is displayed instead of the original hand-drawn figure on a display device.

Using a system embodying the present invention thus structured, a user uses the coordinate input device such as a digitizer or a tablet to time-wise continuously input coordinate data of a basic figure desired to be inputted. The inputted coordinate data are sequentially sampled by the sampling device at specified time intervals and the sampled coordinate data are stored in the memory device. If the user now uses the figure specifying means to specify the type of the basic figure which is being inputted, the extracting means converts the stored coordinate data, for example, into a set of vectors and analyzes it and extracts therefrom geometrical characteristics and position data of the specified basic figure. These extracted geometrical characteristics and position data are used by the figure generating means and the figure drawn by the user is codified as a regular basic figure, which is displayed on the display device instead of the figure drawn by the user.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 1 is a block diagram of a figure input system embodying the present invention, FIG. 2 is a flow chart of the operation of the figure input system shown in FIG. 1, FIGS. 3A–3C are drawings showing an example of input and display when a circle is being inputted, FIG. 4 is a graph of vectors associated with the analysis of the figure shown in FIGS. 3A–3C, FIGS. 5A–5C are drawings shown another example of input and display when a rectangle is being inputted, and FIG. 6 is a graph of vectors associated with the analysis of the figure shown in FIGS. 5A–5C.

DETAILED DESCRIPTION OF A PREFERRED EMBODIMENT

In FIG. 1 which is a block diagram of a figure input system embodying the present invention, numeral 1 indicates a coordinate input device comprising, for example, a tablet having an on-off switch 2 for allowing and inhibiting input, numeral 3 indicates a sampling device which samples at a fixed time interval coordinate data of a basic figure inputted from this coordinate input device 1 in a time-wise continuous manner as a hand-drawn figure, numeral 4 indicates a coordinate buffer for sequentially storing coordinate data $P_i(x_i, y_i)$ sampled at time i, numeral 5 indicates an analyzing means which analyzes this drawn figure by converting the coordinate data 5 $P_i(x_i, y_i)$ stored in this coordinate buffer 4 into a set of vectors $V_i$ and projecting them on an S-$\theta$ graph as will be explained more fully below, numeral 6 indicates a code input device serving as figure specifying means for specifying the type of figure (such as a circle or a rectangle) which is being inputted, and numeral 7 indicates a memory device for storing characteristic data of many types of basic figures. With reference still to FIG. 1, numeral 8 indicates a basic figure coordinate characteristics extracting means which extracts geometrical characteristics and position data of the hand-drawn figure analyzed by the analyzing means 5 on the basis of the type of basic figure specified by the user through the code input device 6 and by using the data stored in the memory device 7, numeral 9 indicates a figure generating means for codifying the hand-drawn figure as a regular basic figure on the basis of the characteristics extracted by the basic figure characteristics extracting means 8, numeral 10 indicates a figure forming means for forming figures on the basic figure codes inputted from the figure generating means 9, and numeral 11 indicates a display device for displaying not only a trajectory of the coordinate points sampled by the sampling device 3 but also the basic figures outputted from the figure forming means 10.

The coordinate input device 1 and the display device 11 are comprised of a tablet with mutually corresponding coordinate systems as symbolically indicated by broken lines in FIG. 1. The analyzing means 5, the memory 7 and the basic figure characteristics extracting means 8 may together be regarded as comprising what was referred to earlier as the extracting means. The code input device 6 is so designed that a type of basic figure can be specified therethrough either before or after a figure is drawn through the coordinate input device 1. A figure input process by the system shown in FIG. 1 is explained next by way of the flow chart of FIG. 2 with reference to FIGS. 3A–3C and 4. Suppose, for example, the user turns on the on-off switch 2 of the coordinate input device 1 and begins to draw a figure as shown in FIG. 3A, intending to input a circle. Coordinate data related to this drawn circle which are timewise continuously inputted from the coordinate input device 1 are sampled by the sampling device 3 at frequency of, say, 100 Hz. Coordinate data $P_i(x_i, y_i)$ at each time i are sequentially obtained and stored in the coordinate buffer 4 (S1).

From the coordinate data $P_i(x_i, y_i)$ thus stored, the analyzing means 5 produces a set of vectors $V_i$ (i=1 . . . 12) pointing from $P_{i-1}(x_{i-1},y_{i-1})$ to $P_i(x_i, y_i)$ as shown in FIG. 3A (S2). Each vector $V_i$ thus determined is expressed next by its length S and angle $\theta$ in an S-$\theta$ graph as shown in FIG. 4 (S3). FIG. 4, which relates to the sampling shown in FIG. 3A, shows that the first vector $V_1$ points in the 90° direction but the angles of the subsequent vectors decrease more or less uniformly, the last vector $V_{12}$ pointing in the −270° direction to represent a difference of 360°. FIG. 4 also shows that the length of the vectors are nearly equal, indicating that the figure was drawn nearly at a constant speed. As mentioned above, the user is assumed to have drawn the figure shown in FIG. 3A, intending to input a circle. So, the code input device 6 is used either before or after the figure is drawn to specify this intention (S4).

Having now learned that the user is wishing to input a circle, the basic figure characteristics extracting means 8 makes use of characteristics data in the memory 7 related to circles and extracts from the data obtained by the analyzing means 5 a radius as a geometrical characteristic of circle and a center as its position data item (S5). In FIG. 4, the circumference of a circle should appear as the sum of the lengths of all vectors appearing along the S-axis and since the angle should always change by 360° (=$2\pi$), the radius r of the circle is obtained as the slope $L/2\pi$ of the straight line passing through all vectors. The center $C(x,y)$ of the circle can be obtained as the average x- and y-coordinates of the points $P_i$ (i=0, . . . 12). FIG. 3B shows the relationship of the radius r and the center $C(x,y)$ thus obtained with the originally hand-drawn figure of FIG. 3A. On the basis of the radius r and the center coordinates $C(x,y)$ thus determined by the basic figure characteristics extracting means 8, the figure generating means 9 codifies the hand-drawn figure as a regular circle (S6). The codified circle is formed as a circle and then displayed on the display device 11 as shown in FIG. 3C, replacing the original hand-drawn circle of FIG. 3A (S7).

FIGS. 5A–5C and 6 show another example whereby the user wishes to input a tilted rectangle by using the input system of FIG. 1 which operates as shown in FIG. 2. Suppose that the user has drawn a rectangle as shown in FIG. 5A and that this hand-drawn rectangle was sampled at 25 points $P_i(x_i, y_i)$ where i=0, . . . 24. A set of 24 vectors $V_i$ (i=1, . . . 24) is similarly obtained and displayed in an S-$\theta$ graph as shown in FIG. 4 for a geometrical analysis. FIG. 6, representing a rectangle, shows that the vectors are clustered in four mutually separate groups, each corresponding to a well-defined value of $\theta$ ($\theta_1$, $\theta_2$, $\theta_3$ or $\theta_4$) such that the angular differences between the mutually adjacent groups are about 90°. Along the S-axis of the graph, three points $h_1$, $h_2$ and $h_3$ are clearly identifiable where one group ends and another starts. Accordingly, one can easily guess that there are two mutually parallel line segments represented by ($d_1$, $\theta_1$) and ($d_3$, $\theta_3$) and two other mutually parallel line segments represented by ($d_2$, $\theta_2$) and ($d_4$, $\theta_4$). Since the user is specifying through the code input device 6 that a rectangle is being intended, the basic figure characteristics extracting means 8 uses the characteristics data related to rectangles that are stored in the memory 7 to analyze the results of the analysis described above and determines as follows the length $L_1$ and $L_2$ of the sides of the rectangle as well as the slope of the longer side and its center of gravity $C(x,y)$:

$$L_1 = (d_2 + d_4)/2,$$
$$L_2 = (d_1 + d_3)/2,$$
$$\theta = (d_1\theta_1 + d_3(\theta_3 + \pi) + d_2(\theta_2 + \pi/2) + d_4(\theta_4 + 3\pi/2))/(d_1 + d_2 + d_3 + d_4),$$
$$x = (x_0 + x_1 + \ldots + x_{24})/25, \text{ and}$$
$$y = (y_0 + y_1 + \ldots + y_{24})/25.$$

FIG. 5B shows the positional relationship between the rectangle determined by the values $L_1$, $L_2$, $\theta$ and $C(x,y)$ thus obtained and the original hand-drawn rectangle. The display device 1 finally makes a display as shown in FIG. 5C replacing the hand-drawn figure shown in FIG. 5A.

In summary, the present invention incorporates the conventional input method of drawing basic figures by using a coordinate input device such as a tablet such that the operator's image can be satisfactorily reflected unlike by indirect input methods. In addition, the user is given the opportunity to specify what kind of basic figure is intended such that the amount of work to be carried out by the system to correctly identify the kind of figure hand-drawn by the operator is significantly reduced and hence that a regularly drawn basic figure corresponding to the user's input can be displayed quickly and accurately. Since data from a hand-drawn figure are sampled and converted into a set of vectors which can be projected on an S-$\theta$ graph, characteristics data of the figure can be extracted more expediently according to the present invention. The foregoing description of a preferred embodiment of the invention has been presented for purposes of illustration and description. It is not intended to be exhaustive or to limit the invention to the precise form disclosed, and many modifications and variations are possible in light of the above teaching. For example, although the present invention was described above regarding input of two-dimensional basic figures, the present invention can be applied to input of three-dimensional figures such as spheres and parallelepipeds. Such modifications and variations that may be apparent to a person skilled in the art are intended to be included within the scope of this invention.

What is claimed is:

1. A figure input system comprising
   a coordinate input device,
   a sampling means for sequentially sampling at specified time intervals coordinate data of a hand-drawn figure, said coordinate data being time-wise continuously inputted from said coordinate input device,
   a storage means for storing coordinate data sequentially sampled by said sampling means,
   a figure specifying means for allowing a user to manually specify the name of an intended kind of basic two-dimensional closed geometrical figure,
   an extracting means for extracting from said coordinate data geometrical characteristics and position data for basic two-dimensional closed geometrical figures of a kind, the name of which has been specified through said specifying means, and
   a figure generating means for codifying said inputted figure as a regular basic figure based on said geometrical characteristics and extracted by said extracting means and displaying said codified basic figure on a display device, wherein a basic two-dimensional closed geometrical figure of said intended kind as specified by said hand-drawn figure is displayed on said display device.

2. The figure input system of claim 1 wherein said extracting means includes a basic figure data memory storing data related to basic two-dimensional closed geometrical figures from which said intended kind of basic figure can be selected by said specifying means.

3. The figure input system of claim 1 wherein said extracting means calculates length and directions of vectors connecting points on said inputted figure inputted through said coordinate input device.

4. The figure input system of claim 1 wherein said coordinate input device includes a digitizer.

5. The figure input system of claim 1 wherein said coordinate input device includes a tablet having an on-off switch.

* * * * *